Figure 3:
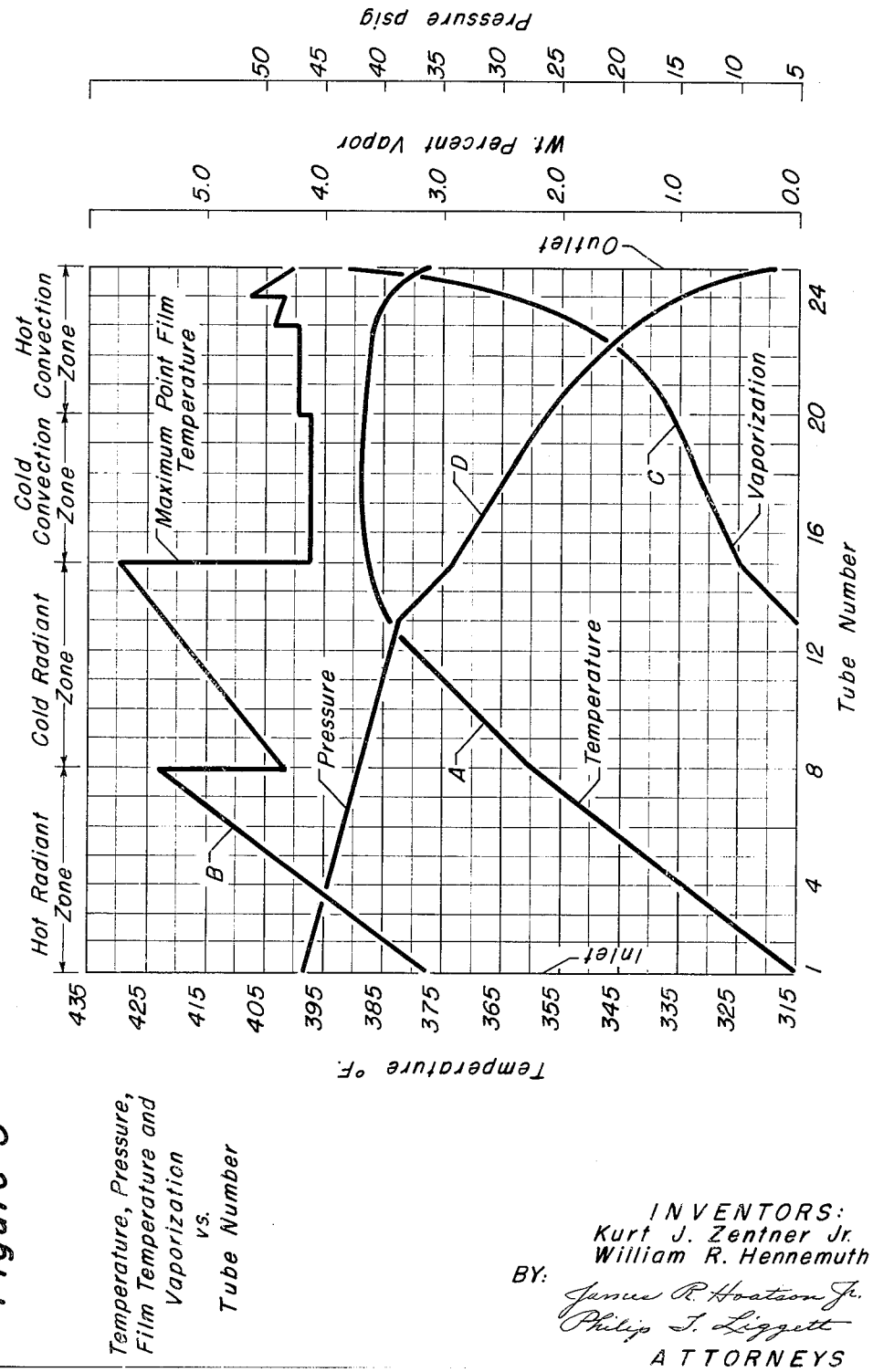

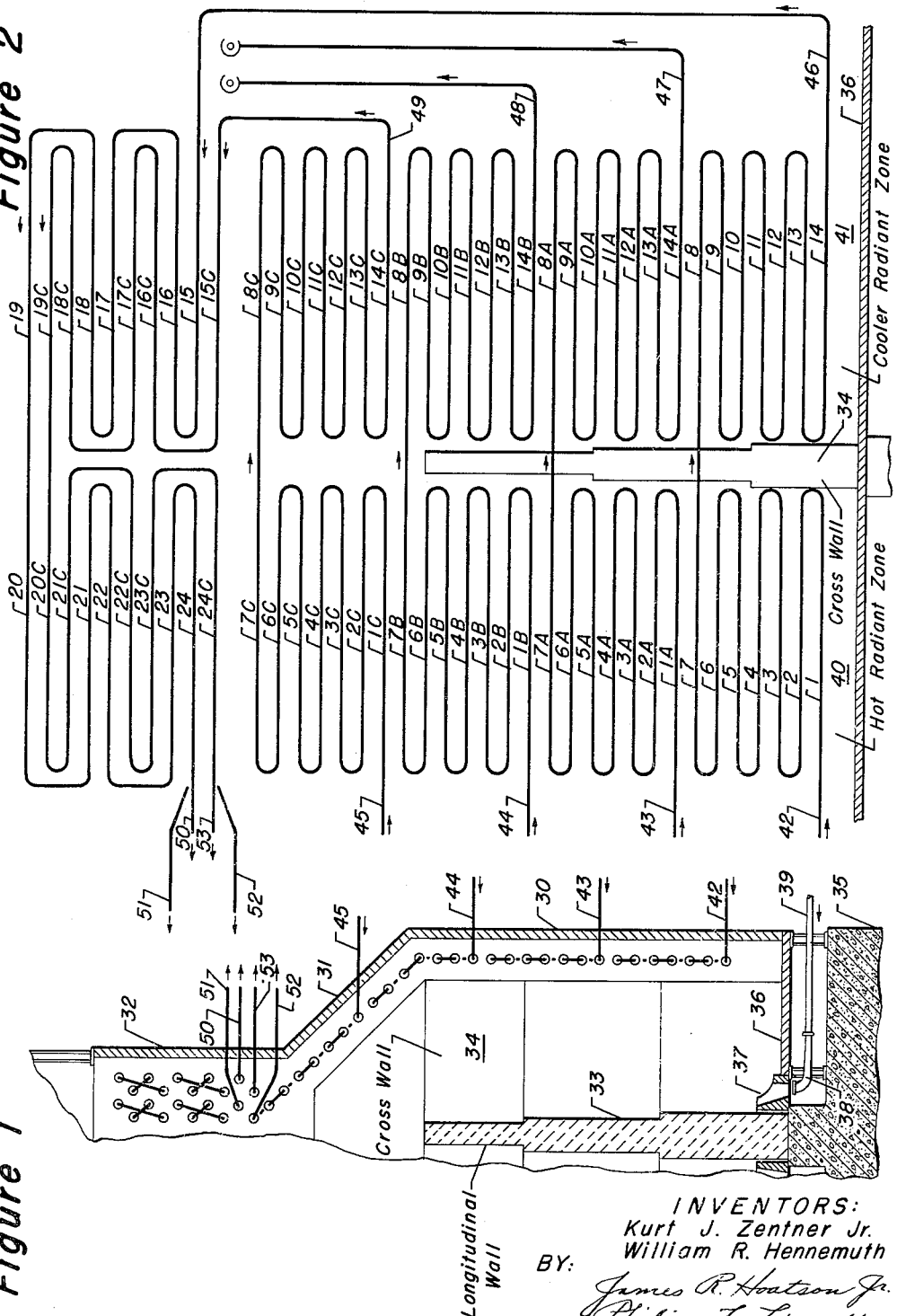

Temperature, Pressure, Film Temperature and Vaporization vs. Tube Number

INVENTORS:
Kurt J. Zentner Jr.
William R. Hennemuth
ATTORNEYS

3,216,401
METHOD OF HEATING A FLUID STREAM TO MINIMIZE FLUID FILM TEMPERATURES
Kurt J. Zentner, Jr., Palatine, and William R. Hennemuth, Mount Prospect, Ill., assignors to Universal Oil Products Company, Des Plaines, Ill., a corporation of Delaware
Filed Apr. 25, 1963, Ser. No. 275,586
2 Claims. (Cl. 122—356)

The present invention relates to means for heating a fluid stream to minimize fluid film temperatures when subjected to radiant and convection heating, and more specifically to a heating system and flow arrangement which precludes a high fluid film temperature and any substantial amount of decomposition of the fluid stream being subjected to high temperature heating.

The heating of low boiling fluids, or those which may readily undergo harmful decomposition, is generally accomplished within conventional forms of heat exchange means or utilize low temperature flue gas heaters, flame tube heaters, and the like. The heating of fluid to a desired peak level without effecting a high fluid film temperature and/or precluding any substantially decomposition is difficult and presents various problems. For example, the heating of a glycol stream to an elevated temperature, which may be well below its boiling point, can lead to discoloration and to some degree of decomposition with a resulting polymer or resin formation whereby harmful residues can build up in the material. Also, with glycol materials, the decomposition leads to excessive corrosion problems for the chamber and pipelines accommodating the material. As a result, the fluid film temperature in the fluid heating means must be kept well below a critical predetermined temperature to minimize any substantial portion of the stream being exposed to a harmful decomposition temperature. The use of extensive multiple stage equipment to gradually bring a fluid stream to the desired level may be utilized to preclude excessive fluid film temperature problems; however, the use of such equipment may turn out to be highly expensive and space consuming from the standpoint of equipment and operational costs necessarily expended to heat a fluid or gaseous heat exchange medium to pass through the heat exchange equipment.

The fired-tube boiler or furnace type of construction also gives rise to a high temperature fluid film temperature and thus does not solve the problem of precluding a fluid breakdown, and decomposition of such material when it comes into contact with the fired tubes. In the heating of high boiling point fluids or reactant stream which are maintained under relatively high superatmospheric pressure, or which do not readily break down into undesired components when being subjected to high fluid film temperature conditions, there is in common use the radiant convection forms of heaters. For example, such heaters are widely used in refineries for various petroleum processing operations by reason of the fact that such heaters are relatively compact and economical in their construction and do provide tube arrangements that can attain high heat absorption rates in both the radiant and convection zones. Conventional radiant heaters, however, have never been considered suitable for the heating of a fluid to relatively low temperature levels where the fluid may be subjected to harmful decomposition by reason of excessive fluid film heating along the wall of the tube.

The fluid heater embodies radiant and convection heating zones that may be constructed in various arrangements, although at the present time they are predominantly of an "updraft" form, which may be rectangular or circular, utilizing burner means in the lower radiant zone to provide high temperature radiant heat to one or more tube banks in such zone and additional tubes in an upper convection heating zone. Other radiant heater designs may embody the "box" or rectangular constructions having high temperature radiant heating zones and lateral or "downdraft" hot gas flow to a convection heating zone. In all such heaters the fluid flow is customarily channeled from the low temperature convection section to the radiant section such that the fluid passes in a countercurrent flow toward the high temperature zone. The present invention is concerned with providing an improved heating arrangement and a flow system where the usual countercurrent flow is unsuitable in connection with the particular fluid which must be brought to a desired temperature peak while precluding any substantial vapor formation or any high fluid film temperature levels which will cause harmful decomposition to a portion of the fluid stream.

It is thus a principal object of the present invention to provide a method of utilizing radiant heating means for effecting efficiently and economically the heating of a fluid stream to a desired peak level while precluding any fluid film temperature substantially greater than such peak temperature level.

A further object of the present invention is to provide a method of heating a fluid stream in a novel flow system which passes the liquid sequentially from a high temperature zone to at least one lower temperature zone whereby the fluid film temperature is controlled and maintained at a level substantially no greater than the peak temperature level of the discharge stream.

In a broad aspect the present invention provides for the heating of a fluid stream subject to harmful decomposition at elevated temperatures in a fluid heater maintaining fluid conduits in radiant and convection heating zones by the improved method which comprises, passing the fluid at a controlled rate in at least one elongated flow path through a hot radiant heating zone and effecting the partial heating of the entire fluid stream while holding the outer fluid film temperature to substantially no excess over said harmful elevated temperature, subsequently passing the fluid from said hot radiant zone through at least one additional elongated flow path in a zone of lower temperature and effecting a reduced conduit wall temperature with an immediate initial reduction in fluid film temperature while at the same time increasing the temperature level of the fluid stream, and subsequently effecting the discharge of the fluid from the heater at a desired peak temperature level and with no substantial excessive fluid film heating and undesired decomposition.

A novel feature of the present invention provides a flow system which passes the fluid from high temperature radiant zones to successively lower temperature zones at control rates such that the wall temperature of the tubes or conduits for the fluid be decreased at the critical points to in turn effect the rapid reduction of the fluid film temperature of the stream as it approaches a particular harmful decomposition temperature. For example, as noted hereinbefore, a glycol stream such as triethylene glycol may be subjected to harmful discoloration and decomposition when all or a small portion of the stream is subjected to an excessive temperature level which may be greatly below the normal boiling of the glycol.

In a more specific embodiment there is thus provided a method for heating a triethylene glycol stream to provide predetermined temperature level while precluding a harmful decomposition temperature for any portion of the stream, where such stream is being heated in a fluid heater maintaining conduit means in radiant and convection heating zones, which comprises, passing said glycol stream at a controlled rate through an elongated flow path in conduit means within a hot radiant heating zone and effecting the partial heating of the entire stream while holding the outer fluid film temperature level to substantially no excess over said harmful decomposition temperature, subsequently passing the glycol stream through a second elongated flow path in a conduit means within a zone of lower temperature radiant heating to provide an increased stream temperature approaching said desired peak level while effecting a rapid initial reduction of the fluid film temperature within the upstream portion of the conduit means of the latter zone to a level substantially lower than that leaving first said conduit means, and then subsequently passing the stream in an elongated flow path through additional conduit means in at least one additional lower temperature convection heating zone and therein initially reducing the fluid film temperature of the fluid stream in said additional conduit means while holding the entire fluid stream to a temperature level at said desired peak temperature approaching the harmful decomposition temperature prior to discharging the resulting heated glycol stream without excessive fluid film heating and any undesired decomposition.

The improved method of heating may apply to various low boiling materials or liquids that are decomposed below the normal boiling points into undesired decomposition reaction products or, alternatively, to temperatures which may cause physical changes, such as discoloration or the like, and it is not intended to limit the present invention to only the heating of a glycol stream.

Reference to the accompanying drawings and the following descriptions thereof will serve to more clearly illustrate the improved method of controlled heating and advantages are obtained in connection therewith.

FIGURE 1 of the drawings is a partial sectional elevational view of one form of radiant heater, having a dividing center wall and a cross wall to provide separated lower radiant heating sceeions as well as elongated upper convection heating sections.

FIGURE 2 of the drawings is a diagrammatic tube arrangement and fluid flow system in conjunction therewith which provides for controlling the fluid film temperature of the stream.

FIGURE 3 of the drawings indicates graphically the results which may be obtained by heating a particular fluid stream in a controlled manner in accordance with the present invention.

Figure 4:
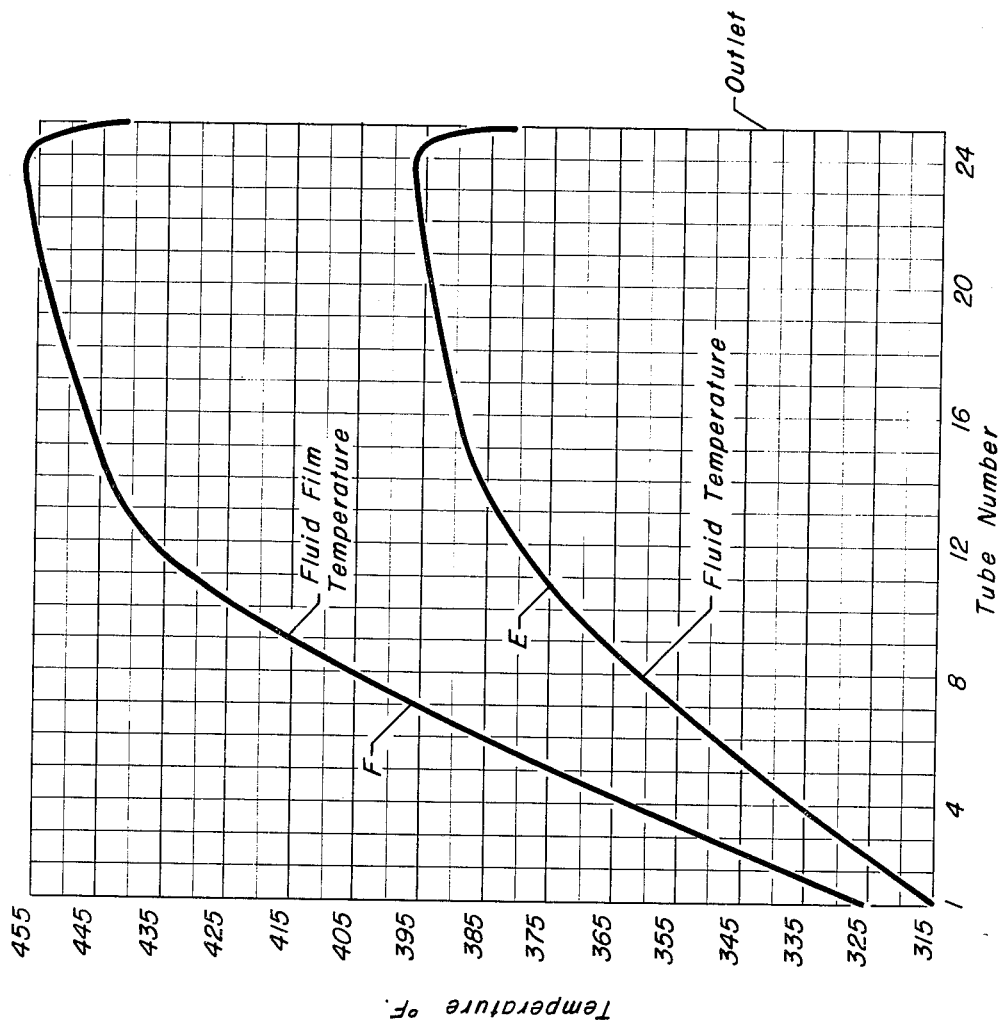

FIGURE 4 of the drawings indicates in graph form the type of temperature curves which may result from the usual fluid flow and method of heating under conventional radiant heating conditions, such curves being shown for comparison with the results from the heating under the conditions of FIGURES 2 and 3.

Referring now specifically to FIGURE 1 of the drawings there is indicated an updraft form of heating chamber having outer walls 30, hip wall sections 31 and upper convection wall sections 32 as well as an interior longitudinal wall 33 and cross wall sections 34. The chamber walls and substructure may be supported from a suitable foundation 35 which in turn has suitable raised portions for supporting the interior longitudinal and cross wall sections 33 and 34. A refractory floor section 36 and burner block member 37 are spaced horizontally above the foundation 35 in order to provide for the positioning of burner means 38 and vertical supply lines 39. While the burner block means 37 and burner 38 are spaced longitudinally along the face of the wall 33 in order to maintain high temperature heating of such wall 33 in to in turn result in high temperature radiant heat to horizontal tubular members positioned along the inside of outer wall sections 30 and 31. The longitudinal wall 33 divides the heating chamber into two elongated half sections while the cross walls 34 in turn divide the lower radiant heating sections of the present embodiment into substantially four separate radiant heating sections which may be fired differently and provide different heat levels at each end of the longitudinal fluid conduits or tubes extending along the side of the radiant and hip sections of the heater.

For small quantities of fluid or for low heat input service, a single radiant heating section without any longitudinal or cross wall sections may suffice.

Referring now to FIGURE 2 of the drawings, there is indicated diagrammatically a plural tube bank or fluid conduit arrangement which provides an plurality of separate tubular elements within a radiant heating section 40, indicated as a "hot radiant zone," while a plurality of separate conduits or tubular members are also indicated in a downstream radiant heating section 41. The latter is indicated in the drawing as a "cooler radiant zone." The cross walls 34 serve to substantially separate the zones 40 and 41 and in turn separate the different levels of radiant heat to the fluid conduits maintained in the respective sections. The plurality of burners 38 firing against the center wall 33 within radiant sections 40 will thus be fired to provide greater heat output than the burners 38 firing against the center wall 33 within the cooler radiant zones 41.

In one specific flow arrangement, the embodiment of FIGURES 1 and 2 indicate diagrammatically a half portion of a symmetrical center wall updraft heater, such that on each side there is a splitting of the fluid charge stream into four separate streams. Thus, a part of the total stream enters inlet 42 and flows through the tube bank having conduits 1 through 7, which in turn connects with a "downstream" tube bank having fluid conduits 8 through 14 along the inside wall of the heater and within the cooler radiant zone 41. The outlet of tube member 14 in turn connects through a crossover member 46 with convection tubes 15 through 19 in the upper portion of the heating chamber above the radiant zone 41. Tube 19 in turn communicates with an additional bank of convection tubes, 20 through 24, in the opposing end of the convection section above the hotter radiant zone 40, with the resultant heated fluid stream being discharged through the outlet 50.

In a similar manner, another fractional portion of the charge stream to be heated passes serially through the heater, passing from an inlet 43 at the hot radiant zone to an outlet 51. The initial flow from inlet 43 is to the tube bank containing tubes 1A through 7A, thence to tubes 8A through 14A and then through crossover member 47 to convection tubes not indicated in the drawing, but which are in an indentical parallel arrangement to the convection tubes shown therein whereby the heated stream is discharged through the outlet indicated diagrammatically as 51. Another fractional portion of the charge stream may pass in a similar path through the bank of tubular conduits 1B through 7B within radiant zone 40, conduits 8B through 14B within radiant zone 41, and thence through crossover 48 to still another set of convection tube members in the upper portion of the heater that are in a parallel and identical arrangement to the tubular members indicated in the drawing such that a resulting heated fluid stream is discharged through outlet 52. Still another fractional portion of the charge stream is indicated as passing in a similar manner through tubular members 1C through 7C of radiant zone 40, through tubular members 8C through 14C in radiant zone 41, and thence through crossover 49 to convection tubular member 15C through 19C to be finally discharged by way of outlet 53 from convection tube bank 20C through 24C.

The splitting of the charge stream into the plurality of smaller streams permits a somewhat greater control of pressure differential across the heater and of mass velocity, together with a greater control of the fluid film temperature to preclude any excessive or harmful decomposition temperatures. Tube sizes within the various sections may be varied to accommodate a particular quantity of fluid charge as well as heat levels. It will be noted that the present novel tube arrangement provides that the cold fluid is first charged to the high temperature zone and heated to a point where the film temperature reaches a maximum point and then is discharged into a cooler heating zone where the heating of the fluid stream, of course, increases but the fluid film temperature is permitted to undergo an immediate initial reduction by virtue of the lower tubular wall temperatures. The difference in temperature levels between the hot and cooler radiant heat zone will, of course, vary in accordance with the particular type of fluid being heated in the flow system.

FIGURE 3 of the drawing shows graphically the advantageous results that may be obtained by heating a particular fluid stream in a novel flow system provided in the embodiment of FIGURES 1 and 2 and in accordance with the present invention. Specifically, FIGURE 3 has been prepared to show the results of heating a triethylene glycol stream, which has a boiling point in the order of 550° F., but which may undergo harmful discoloration and decomposition at substantially lower temperature levels. Thus, in the present example, there is provided a desired fluid heating level of the order of 375° F., as the required discharge temperature, together with a limitation of maintaining fluid film temperatures below about 450° F., and preferably below 430° F. in order to preclude harmful decomposition of the triethylene glycol stream and excessive vaporization of the water content in such stream. The glycol stream of the present example contains approximately 6% to 7% water which modifies slightly the boiling point of the combined stream as well as the percentage vaporization.

In order to correlate the graphs of FIGURE 3 with the flow embodiment of FIGURE 2 of the drawing, the number of tubes or fluid conduits 1 through 24 are plotted along the bottom of the chart while temperature levels, in degrees F., are indicated vertically along the left hand side of the chart. Pressure and vaporization levels are also shown, with pressure in pounds per square inch (p.s.i.g.) and vaporization, as weight percent of the total stream, being plotted vertically along the right side of the graph. Thus, Curve A in FIGURE 3 indicates the gradual increase in the temperature of the glycol stream as it passes successively through tubes 1 to 7 in zone 40, tubes 8 through 14 in zone 41 and thence through the convection tubes 15 to 24 in the upper convection zones. Curve B shows the maximum film temperature of the fluid as it passes through the heating chamber successively from the inlet point to the outlet, with a relatively sharp temperature rise in the hot radiant zone 40 until such time as the fluid reaches tube 8 in the cooler radiant zone 41, at which time the lower tube wall temperature effects a rapid initial reduction in the fluid film temperature. Specifically, in the present example the film temperature falls from about 423° to about 402° F. The fluid film temperature then continues to rise again as the fluid passes to the outlet end of the cold radiant zone, i.e. at tube 14, where a maximum film temperature of approximately 430° F. is reached. However, here again the fluid film temperature drops immediately to a less harmful level of about 397° F. as the fluid stream reaches the cooler convection zone. It will be noted in connection with Curve A that the fluid stream temperature substantially levels off through the entire convection zone of the heating chamber and actually decreases as it leaves the chamber through outlet 50 to approximately the 375° F. level. At the same time, the fluid film temperature in the convection zone holds relatively constant, although there is a gradual increase to the order of about 408° F. at the end of tube 24.

A small amount of vaporization of the charge stream, which may be primarily attributed to the water content of the stream is indicated by Curve C. Reference to the chart indicates vaporization beginning gradually after the fluid reaches tube 13 and continuing slowly to the outlet where the maximum vaporization is about 4% by weight.

The Curve D shown in FIGURE 3 indicates the gradually decreasing pressure of the fluid stream as it passes from the inlet to the heater, where there is about 47 p.s.i.g, to the outlet point, where the pressure is approximately 6 p.s.i.g.

The present example represents controlled firing such that the tube wall temperatures for tubes 7, 7A, 7B and 7C within the high temperature radiant zone 40, are of the order of about 444° F. providing the maximum fluid film temperature of 424° F. The burners in the cooler radiant heating zone 41 are operated to provide about 11° F. lower temperature for tubes 14, 14A, 14B and 14C, with a maximum tube surface temperature of the order of 433° F. temperature.

For comparative purposes, FIGURE 4 of the drawings indicates Curves E and F which in turn represent fluid temperatures and fluid film temperatures for a similar fluid progressing through an equivalent number of tubes, and sized tubes, as indicated in FIGURES 1 and 2 of the drawings, with the flow being in a conventional manner, having the charge stream passing successively from cooler to hotter zones. In other words, Curves E and F provide the resulting heating effects for the fluid passing from the convection section to the cooler radiant zone and thence to the high temperature radiant zone. More specifically, in this arrangement, the fluid temperature would also increase from the order of 315° F., to the desired 375° F. range, with the fluid gradually reaching a maximum of the order of 395° F. just ahead of the outlet from the heater. At the same time, the fluid film temperature would continue to rise to excessive levels from the inlet end of the heater at a temperature of about 325° F. to a maximum of 460° F. prior to being discharged from the heater. In other words by virtue of the fluid stream passing successively to higher temperature zones, there is an increase in fluid film temperatures to an obvious undesired high level where harmful decomposition may take place.

In the foregoing example, covering the heating of a triethylene glycol stream, the particular heating level of 375° F. was set as that temperature desired to provide for the reheating of the glycol stream in a solvent stripping operation while at the same time precluding any harmful decomposition thereof. However, it is to be understood that in other operations it may be desired to heat the glycol to a lower level or to a high temperature level and that slight modifications in the number and/or size of the tubes in any one radiant heating zone or the adjustment of heat output from the burners to the heating chamber may be modified and controlled to provide a desired efficient heating curve while at the same time precluding high fluid film temperatures. It may also be pointed out that a greater or lesser number of heating zones within any one heating chamber may be provided to permit variations in burner and heat output levels in the separated zones and to effect control of the heating of the fluid conduits whereby the heat absorption rates will vary. However, in all cases, in accordance with the present invention, the tube arrangements and flow provides an improved method of heating by passing the stream sequentially from the high temperature zones to successively lower temperature zones, particularly in the initial stages of heating so that there may be obtained rapid heat reductions in the fluid film temperature as the fluid film approaches a harmful decomposition temperature. The term "decomposition temperature" as used herein may, in some instances with respect to certain fluids, pertain to a boiling point or vaporization temperature; however, as in the case of the glycol materials, the term may refer to a particular critical temperature level which is known to bring about an undesired physical

We claim as our invention:

1. In the heating of a fluid stream subject to harmful decomposition at elevated temperatures in a fluid heater having a controllably fired hot radiant heating zone, a separately fired radiant zone of lower temperature, and connected to said zones a convection heating zone, each of said zones having a plurality of fluid conduits, the improved method of effecting the heating of such fluid to preclude an excessive fluid film temperature and any undesired decomposition along the inside walls of the fluid conduits of such heater, which comprises, initially passing the fluid at a controlled rate in at least one elongated flow path through a controllably fired hot radiant heating zone and effecting the partial heating of the entire fluid stream while holding the outer fluid film temperature to substantially no excess over said harmful elevated temperature, subsequently passing the fluid from said hot radiant zone through at least one additional elongated flow path in a separately fired zone of lower temperature and effecting a reduced conduit wall temperature with an immediate initial reduction in fluid film temperature while at the same time increasing the temperature level of the fluid stream, and subsequently effecting the discharge of the fluid from the heater at a desired peak temperature level and with no substantial excessive fluid film heating and undesired decomposition.

2. In the heating of a fluid stream subject to harmful decomposition at an elevated temperature level below its boiling point in a fluid heater having a controllably fired hot radiant heating zone, a separately fired radiant zone of lower temperature, and connected to said zones a convection heating zone, each of said zones having a plurality of fluid conduits, the improved method of effecting the heating of such fluid to preclude an excessive fluid film temperature along the inside walls of the fluid conduits of such heater at a level materially above the harmful temperature level, which comprises, initially passing the fluid at a controlled rate in at least one elongated flow path through a controllably fired hot radiant heating zone and effecting the partial heating of the entire fluid stream while holding the outer fluid film temperature to substantially no excess over said undesired temperature, subsequently passing the fluid through a second elongated flow path in a separately fired zone of lower temperature radiant heating and effecting a lower conduit wall temperature with a rapid initial reduction in the fluid film temperature while at the same time increasing the temperature level of the entire stream, and then subsequently passing the fluid stream in an elongated flow path through at least one lower temperature convection heating zone and therein bringing said fluid to a peak temperature level prior to discharging such fluid from the heater and with no excessive fluid film heating and undesired decomposition.

References Cited by the Examiner
UNITED STATES PATENTS

| | | | |
|---|---|---|---|
| 2,025,667 | 12/35 | Keith | 122—356 |
| 2,090,504 | 8/37 | Schutt et al. | 122—356 |
| 3,055,347 | 9/62 | Bailey et al. | 122—33 |

PERCY L. PATRICK, *Primary Examiner.*

FREDERICK L. MATTESON, JR., ROBERT A. O'LEARY, *Examiners.*